United States Patent [19]

Antrim et al.

[11] Patent Number: 5,340,535
[45] Date of Patent: Aug. 23, 1994

[54] VANADIUM-NICKEL-CHROMIUM MASTER ALLOY

[75] Inventors: Robert G. Antrim, Albany; Edward G. Dirrett, Jefferson; Steven M. Tuominen, Albany, all of Oreg.

[73] Assignee: Teledyne Industries, Inc., Albany, Oreg.

[21] Appl. No.: 963,665

[22] Filed: Oct. 20, 1992

Related U.S. Application Data

[62] Division of Ser. No. 828,212, Jan. 30, 1992, Pat. No. 5,196,048.

[51] Int. Cl.$^5$ ............................................. C22C 30/00
[52] U.S. Cl. ................................................... 420/588
[58] Field of Search ......................... 420/442, 424, 588

[56] References Cited

U.S. PATENT DOCUMENTS 2,921,850  1/1960  Inouye et al. ..................... 420/442

FOREIGN PATENT DOCUMENTS 134528  3/1985  European Pat. Off. ............ 420/442
486698  4/1984  U.S.S.R. .............................. 420/442

*Primary Examiner*—Deborah Yee
*Attorney, Agent, or Firm*—Shoemaker & Mattare, Ltd.

[57] ABSTRACT

A master alloy comprising vanadium, nickel and chromium having equal weight percentages of vanadium and nickel and from about 4% by weight to about 17% by weight of the total weight, of chromium is used to prepare alloys having those metals and other metals selected from the group consisting of zirconium, titanium, cobalt, manganese, aluminum and mixtures thereof.

1 Claim, No Drawings

VANADIUM-NICKEL-CHROMIUM MASTER ALLOY

This is a division of application Ser. No. 07/828,212, filed Jan. 30, 1992, now U.S. Pat. No. 5,196,048.

BACKGROUND OF THE INVENTION

1. Field of the Invention

The present invention relates generally to the preparation of alloy materials capable of hydrogen storage and suitable for use in rechargeable electrochemical cells. More particularly, this invention relates to master alloys useful in preparing metal alloys used as electrodes in rechargeable electrochemical batteries or cells. More particularly, the invention relates to the preparation of alloys containing vanadium nickel and chromium and other metals suitable for use as hydrogen storage electrodes.

2. Description of Related Art

Secondary cells using rechargeable hydrogen storage negative electrodes are now well known in the battery art. The reactions which take place at both the positive electrode and the negative electrode reversibly store hydrogen electrochemically. The advantages of such cells are well known, making such hydrogen storage cells particularly desirable and suitable for many commercial applications.

In U.S. Pat. No. 4,948,423, Fetcenko et al., there are disclosed numerous techniques by which hydrogen storage alloy material can be formed including vacuum induction melting in high density, high purity graphite crucibles. Many of those techniques employ high temperature melts but those techniques generally suffer for a variety of reasons. For example, while some processes are operative on small laboratory and pilot scales, when large scale operations are attempted, they become too costly to be commercially effective.

While consumable arc melting has been used, it also has difficulties which are burdensome including the handling of the high currents necessary; the resulting lack of homogeneity particularly where those alloys used have no single component which constitutes at least 90% of the overall alloy material. The wide variety of alloys which have been proposed for use as the reactive material in hydrogen storage electrodes are alloyed extensively and are therefore prone to exhibit non-homogeneity. In addition, the high cost of this process both in terms of high energy and high labor costs results in process inefficiencies.

As stated by Michael A. Fetcenko in U.S. Pat. No. 5,002,730, oxygen is a contaiminate in the metal alloys used as electrodes in rechargeable electrochemical batteries. Based on heats of formation of oxides and relative stabilities of metal oxides, the oxygen is expected to be present primarily as zirconium oxide which decreases the amount of zirconium available as active hydride forming sites which will decrease the storage capacity of the cell. Carbon is also considered to be a contaminant since it will also preferentially form compounds with zirconium that decreases the number of active zircomium sites.

While the use of pre-alloys or master-alloys is not new per se it is appreciated by those skilled in the art, that in order to insure complete dissolution of the elemental metal additions, extremely high temperatures are needed. This is particularly so where high melting temperature metals such as Cr are used since that element has a melting temperature of 1857° C. It has been required to heat for 55 to 65 minutes in order to achieve a temperature of about 1800° C. to dissolve the Cr. Additional time is needed to maintain a decreased temperature of 1750° C. for pouring molten metal into a mold. It would be highly desirable to form useful alloys having homogeneity of structure without the use of such high temperatures.

Also since it is undesirable to have methane gas formation during cycling of the rechargeable batteries, it would clearly be an advantage to produce alloy material suitable for secondary battery use having a carbon content sufficiently low so that the alloy when used as an electrode material did not allow significant methane gas to form when cycling the battery.

Various patents relating to hydrogen storage hydride electrode materials methods for preparation and their use in electrochemical applications are already known. Those methods, particularly those for fabricating hydrogen storage electrodes from alloys other than the novel metal alloys and novel processes of the present invention, are incorporated herein and made a part hereof and include U.S. Pat. No. 5,002,730.

It is therefore one object of this invention to produce V-Ni-Cr-Zr-X alloyd having carbon and oxygen contents consistently lower than those of existing battery alloys.

SUMMARY OF THE INVENTION

The present invention avoids many of the prior art problems involving hydrogen battery materials and processes by the use of the formation of a master alloy comprised of specific proportions of Vanadium, Nickel and Chromium in which there are substantially no chromium inclusions or free elemental chromium, and which can be further alloyed with additional alloying materials to form a hydrogen battery alloy useful in the preparation of active electrodes and rechargeable electrochemical storage cells.

It has been unexpectedly found that when Chromium is added to a first alloy of roughly equal amounts of V-Ni, in amounts of Chromium ranging from about 5%–12% by weight, the resulting physical characteristics of the metal alloy are altered. For example, as will be more fully described hereinafter, the friability of the resulting alloys will be markedly improved, providing for greater ease in crushing the metal alloy to a particulate size suitable for rapid melting with other metals to make a final alloy. Other alloying metals that can be used in place of zirconium include cobalt and iron.

In particular the present invention comprises a process for preparing a first precursor alloy of vanadium-nickel-chromium or a master alloy used in preparing a second multi-component metal alloy selected from the group of metals consisting of vanadium, nickel, chromium, titanium, cobalt, manganese zirconium and aluminum, said second alloy adopted for use as material for electrodes in rechargeable electrochemical hydrogen storage cells, said process for preparing the first precursor alloy comprising the steps of:

(a) forming a starting powder mix of aluminum powder, vanadium pentoxide powder, nickel powder and chromium powder, said aluminum powder added in slight excess of its stoichiometric amount for an aluminothermic reduction reaction;

(b) placing said powder mix in a slag bed and initiating an aluminothermic reaction with sufficient local heating to reduce the vanadium pentoxide to vanadium metal and sufficient heat to melt the vanadium and to melt and dissolve the nickel and chromium present therein, providing a molten vanadium-nickel-chromium alloy having a melting point of from about 1200° C. to about 1320° C.;

(c) solidifying and cooling said molten alloy at ambient temperature in the slag bed, then separating said solidified alloy from the slag bed; and (d) comminuting said separated alloy, having a particle size of less than about 1 inch across.

Upon analysis it is found that said V-Ni-Cr alloy has a Ni content of from about 40 to about 60% by weight, a V content of from about 60 to about 40% by weight, a Cr content of from about 4 to about 17% by weight, and has an oxygen content of not more than about 0.18% by weight. Further the degree of friability, determined by the well known work index procedure is about 6 or less.

In still another aspect of the present invention, there is disclosed a process of claim 1 for the preparation of the multi-component metal alloy selected from the group of metals consisting of vanadium, nickel, chromium, zirconium, titanium, cobalt, manganese and aluminum, said alloy adapted for use for electrode materials in rechargeable electrochemical hydrogen storage cells, said process comprising the steps of:

(a) forming a starting mix of metals consisting of vanadium-nickel-chromium first precursor alloy as described above and metal solids from the group of metals consisting of nickel, zirconium, titanium, cobalt, manganese, aluminum, and additional elemental chromium which can be added as particulate solids and the chromium is present as particulate solids and have a diameter of size of less than about 3 mm and in the form of about −6 mm mesh size.

(b) placing said metal mix in a high density, high purity graphite crucible in an induction furnace within a vacuum chamber and heating said mix initially under vacuum, back filling the vacuum chamber with a partial atmosphere of inert gas, and inductively heating said mix for a time sufficient to produce a molten metal charge having reduced amounts of impurities of oxygen and carbon and vaporizing some of said chromium which is less than about 4% by weight, the oxygen is less than about 1800 ppm and the carbon content less than about 320 ppm.

(c) pouring said molten metal charge into a high density, high-purity graphite mold within the vacuum chamber, cooling and solidifying the metal at about ambient temperature; and (d) removing said solidified, cooled metal alloy from said graphite mold.

The V-Ni-Cr alloys, or pre-alloys, or master alloys, of the present invention are preferably prepared using an aluminothermic reduction process with vanadium pentoxide such as first described by O. N. Carlson et al. in The Journal of Metals (March, 1966) pp. 320–323. In this aluminothermic reaction, $V_2O_5$ is reduced to metal using aluminum by the following reaction:

$$10Al + 3V_2O_5 \rightarrow 6V + 5Al_2O_3$$

That reaction utilizes a vacuum-tight reaction crucible and the loading of the charge is done under a protective blanket of argon to minimize nitrogen contamination. This reaction is highly exothermic and produces sufficient heat to yield liquid or molten products. After cooling to near room temperature, the vanadium metal phase is separated from the $Al_2O_3$ slag. According to the practice of the present invention, nickel is added to an aluminum powder plus $V_2O_5$ powder mixture in the preferred amount in the form of nickel powder. The preferred amount of Chromium can be added in the form of powder. The exothermic aluminothermic reduction reaction is initiated and produces sufficient heat to melt and dissolve the nickel and chromium within the molten vanadium. Vanadium has a melting point temperature of about 1910° C.

Typically, in such a method for producing useful quantities of vanadium-base alloy using the aluminothermic reduction process, a perfect mass balance cannot be obtained. Therefore, to assure complete reduction of $V_2O_5$ to metal it has been found that a slight excess of aluminum must be added to the starting mix of $V_2O_5$ and aluminum. It is therefore common that the resulting alloy will contain some residual level of aluminum oxide in the resulting vanadium, chromium and nickel containing alloy since complete separation of the vanadium alloy metal and the $Al_2O_3$ slag will not occur. A desirable vanadium-nickel alloy utilizing the foregoing process will have a nickel content ranging from about 40 to about 60% by weight with the bulk of the remainder being vanadium by weight.

In the preparation of alloys having high vanadium contents, the lower melting vanadium-nickel alloy as produced by the aluminothermic reaction described, will easily dissolve in the lower melting nickel and other metals producing a homogeneous final alloy upon cooling. The vanadium-nickel alloy described will melt at a temperature in the range of from about 1200° C. to about 1320° C. depending on the compositions of the constituent components, while vanadium alone has a melting temperature of about 1910° C.

Likewise, when chromium powder is added to the described aluminothermic reaction with vanadium pentoxide and nickel powder in the preferred amounts, the resulting vanadium-nickel-chromium pre-alloy or master alloy will also dissolve readily in molten nickel or other molten metal mixtures which are maintained at a temperature higher than the melting temperature of the V-Ni-Cr alloy.

For the preparation of metal alloys containing vanadium, nickel and other metallic elements, including chromium, to which the vanadium is added using the V-Ni-Cr master alloy, the vanadium-nickel-chromium or other alloy produced by the aluminothermic process should preferably be broken up into small chunks suitable for precise weighing. For ease of alloy formation, these chunks should be of a size to be readily dissolved in the melt of other metals used to formulate the final desired alloy. The master alloy comprising vanadium, nickel and chromium useful herein is substantially free of unalloyed chromium and inclusions of chromium.

Thus, the present invention presents a cost-effective and efficient means of providing a final alloy which contain V-Ni or V-Ni-Cr and other metals which is useful as an electrochemical alloy material, and is further characterized by having carbon and oxygen contents present in an amount substantially lower than other commercially available alloys having the same compositions.

DESCRIPTION OF THE PREFERRED EMBODIMENTS

The present invention will be better understood by reference to the following examples.

EXAMPLE 1

The powders used in the herein-described aluminothermic reduction process were prepared after having been weighed to within (+) or (−) 0.05 kilogram and placed in a stainless steel twin cone blender where they were mixed for 25 minutes. A half and half by weight vanadium-nickel alloy was obtained. The resulting mixture was placed in a slag bed and a vanadium starter wire with copper lead wires placed in the mixture. A welding power supply was connected to the copper lead wires. The aluminothermic reaction was initiated by the passage through the vanadium wire of electric current. After completion of the reaction and separation of the melt from the slag, the chemical analysis of the resultant cooled vanadium-nickel alloy was confirmed.

The following series of formulations was tested.

Series I

| | |
|---|---|
| $V_2O_5$ | 2.65 kg. |
| Ni powder | 1.49 kg. |
| Al powder | 1.48 kg. |

It was found that this melt contained 50.8% Ni, 42.8% V; and 6.21% Al along with 0.17% O. The residual aluminum content was too high to be useful for further processing as a pre-alloy or master alloy.

Series II

| | |
|---|---|
| $V_2O_5$ | 2.66 kg. |
| Ni | 2.23 kg. |
| Al | 1.48 kg. |

After the aluminothermic reduction was carried out, the formed alloy could not be comminuted even when cooled in liquid nitrogen.

Series III

| | |
|---|---|
| $V_2O_5$ | 3.02 kg. |
| Ni | 1.49 kg. |
| Al | 1.48 kg. |

The resultant friable metal alloy contained by weight 48.0% V, 50.3% Ni, 1.62% Al, 0.26 oxygen and 0.034% nitrogen. The aluminum content was still higher than desired, but this small scale trial demonstrated the feasibility of using an aluminothermic reduction process to produce a vanadium-nickel alloy.

Series IV

This trial was conducted to scale up the process used in Series III. The following powders were blended in eight equal parts for 15 minutes each and aluminothermically reduced as previously described:

| | |
|---|---|
| $V_2O_5$ | 24.17 kg. |
| Ni | 11.91 kg. |
| Al | 11.83 kg. |

Although the alloy chemistry should have been very similar to that of Series III, the resultant metal alloy was not friable.

The next series of trials (V through IX) were conducted to determine what metal powders could be added to the aluminothermic blends before reaction to yield a vanadium-nickel-X alloy that would be friable and useful for alloy production. The three metal powders selected for trials were chosen because one or more battery alloys contain these metals.

Series V

Chromium metal powder at a nominal 5% level by weight was added for this trial because the vanadium-nickel master alloy is intended for use in electrochemically active alloys that all contain chromium. The following powders were weighed, blended for 20 minutes, and reacted as described for Series I.

| | |
|---|---|
| $V_2O_5$ | 3.02 kg. |
| Ni | 1.49 kg. |
| Al | 1.48 kg. |
| Cr | 0.15 kg. |

The resultant metal, which contained by weight 46.8% V, 47.1% Ni, 4.04% Cr, 1.37% Al and 0.46% oxygen, was much more friable than the 48.0% V–50.3% Ni alloy produced in Series III.

Series VI

Cobalt metal powder at a nominal 5% level by weight was added to a base 50 Ni—50V blend for this trial to determine the effect on friability. The following powders were weighed, blended for 20 minutes, and reacted as described for Series I.

| | |
|---|---|
| $V_2O_5$ | 3.02 kg. |
| Ni | 1.49 kg. |
| Al | 1.48 kg. |
| Co | 0.15 kg. |

The resultant metal, which contained by weight 46.6% V, 47.2% Ni, 4.41% Co, 1.40% Al and 0.51% oxygen, was more friable than the alloy produced in Series III but was not as friable as the chromium-containing alloy produced in Series V.

Series VII

Iron metal powder at a nominal 5% level by weight was added to a base 50 Ni—50V blend to determine the effect on friability. The following powders were weighed, blended for 20 minutes, and reacted as described for Series I.

| | |
|---|---|
| $V_2O_5$ | 3.02 kg. |
| Ni | 1.49 kg. |
| Al | 1.48 kg. |
| Fe | 0.15 kg. |

The resultant metal which contained by weight 45.6% V, 48.1% Ni, 4.55% Fe, 1.45% Al and 0.141% oxygen broke apart easier than the alloy produced in Series III but did not crush as well as the chromium-containing alloy produced in Series V.

Series VIII

Chromium metal powder at a nominal 8% level by weight was added to a base 50 Ni—50V blend to determine if the friability could be further increased over that of the alloy produced in Series V. The following powders were weighed, blended for 20 minutes, and reacted as described for Series I.

| | |
|---|---|
| V$_2$O$_5$ | 3.02 kg. |
| Ni | 1.49 kg. |
| Al | 1.48 kg. |
| Cr | 0.25 kg. |

The resultant metal, which contained by weight 43.6% V, 47.3% Ni, 6.70% Cr, 1.54% Al and 0.31% oxygen, was more friable than the alloy from Series V which contained 4.04% Cr by weight.

Series IX

Chromium metal powder at a nominal 12% level by weight was added to a base 50 Ni—50V blend to determine if the friability could be further increased over that of the alloy produced in Series VIII. The following powders were weighed, blended for 20 minutes, and reacted as described for Series I:

| | |
|---|---|
| V$_2$O$_5$ | 3.02 kg. |
| Ni | 1.49 kg. |
| Al | 1.48 kg. |
| Cr | 0.40 kg. |

The resultant metal, which contained by weight 42.5% V, 44.8% Ni, 10.5% Cr, 1.5% Al and 0.03% oxygen, was the most friable of all alloys produced. This alloy was judged to be acceptable for large-scale crushing to yield a particle size suitable for ease of alloying with other metals.

Additional aluminothermic reduction series were conducted to verify that the process could be scaled up to produce larger quantities of vanadium-nickel-chromium alloys and to produce quantities of alloys to be used in melting trials of the battery alloys.

Series X

In this series the process used in Series IX was scaled up by a factor of ten. The following powders were weighed and blended in ten equal parts for ten minutes each and processed as described in Series I:

| | |
|---|---|
| V$_2$O$_5$ | 30.2 kg. |
| Ni | 14.9 kg. |
| Al | 14.5 kg. |
| Cr | 4.04 KG. |

The resultant metal which contained by weight 43.4% V, 44.7% Ni, 10.6% Cr, 1.2% Al and 0.08% oxygen was broken up readily and quickly and easily crushed to less than 25 mm screen size for use in alloy melting.

Series XI

In this series the process used in Series X was scaled up again by more than a factor of three. The following powders were weighed, blended for 20 minutes in one step using a larger blender than used previously, and processed in a manner similar to that described for Series I. The only difference is that the powder mixture was placed inside a 254 mm diameter aluminum tube.

| | |
|---|---|
| V$_2$O$_5$ | 99.8 kg. |
| Ni | 45.4 kg. |
| Al | 48.1 kg. |
| Cr | 11.3 kg. |

The resultant metal which contained by weight 45.3% V, 41.9% Ni, 9.36% Cr, 1.95% Al and 0.01% oxygen was broken and crushed as easily as the alloy produced in Series X.

Series XII

This series was a duplication of Series XI except for two items. The blending time was increased to 30 minutes and the powder mixture was placed inside a 203 mm diameter aluminum tube for aluminothermic reduction. The resultant metal which contained by weight 43.7% V, 42.6% Ni, 10.38% Cr, 2.81% Al and 0.01% oxygen was broken and crushed as easily as the alloy produced in Series X.

SMALL SCALE MELT TRIALS

Before any of the vanadium-nickel-chromium alloys were used in the melting of final alloys, a commercial sample of vanadium-nickel alloy obtained from Reading Alloys, Inc. that contained by weight 61.2% V, 37.6% Ni, 0.33% Al and 0.75% oxygen was used for melting trials. Each of the raw materials (V-Ni alloy and other metals in solids forms) necessary for melting of a metal alloy containing V-Ni-Cr and other metals in solids forms was carefully weighed to within + or −0.01 kilogram.

Four alloy mixes of the same chemical composition were prepared; one mix weighing 6.936 kg and three mixes, each weighing 4.618 kg. The nominal desired chromium content of the final alloy was 6.07% by weight, but 25% excess chromium by weight was added to compensate for losses expected during melting because molten chromium has a high vapor pressure. Before placing each mix in a crucible for melting, the components were roughly mixed by rotating in the bottom of a steel drum.

Melting was accomplished using a cold-wall induction process at the United States Bureau of Mines Research facility in Albany, Oreg. In this process, the metal is induction heated while inside a crucible made of water-cooled copper tubing segments constructed so the crucible itself is not inductively heated. This type of induction melting system is described in U.S. Pat. No. 4,923,508 by R. S. Diehm and B. K. Zuidema. The induction coil, crucible, and graphite mold are all contained within a vacuum chamber. For all melting trials made using the cold-wall induction process, the chamber was first evacuated to a pressure less than 50 microns, backfilled with argon, re-evacuated to a pressure of less than 50 microns and backfilled with argon to a pressure of about one third atmosphere before heating.

The first melt was of the alloy mix with the larger weight. This alloy, designated No. 1, required about 15 minutes of heating time to be fully molten after which the molten metal was poured into a 119 mm diameter graphite mold. The metal skull that remained in the crucible retained the same nominal chemical composition which was the same as the remaining three mixes. All three mixes were melted and poured into a 119 mm diameter graphite mold using the same process. These melts were designated numbers 2, 3 and 4. Based on visual observation of the melt pool through a sight port, it appeared that all alloy constituents were fully dissolved in the molten metal. Cold-wall induction melting promotes rapid stirring; the zirconium solids that were initially about 1 mm thick were readily observed rising to the top of the melt pool before they dissolved. The chromium solids were in the form of minus 6 mm mesh with most particles being less than 3 mm diameter. Because zirconium and chromium have similar melting temperatures, 1852° C. and 1857° C., respectively, it was believed that both should be fully dissolved when no solid particles could be observed. Each molten alloy was poured into a graphite mold about three minutes after no solid particles were observed rising to the top of the melt pool.

Samples for chemical analysis were taken from the 119 mm diameter ingots. Ingots number 1 and 2 were sampled at two locations. The nominal chromium content of all ingots was 6% by weight. However, the analyzed chromium contents, as shown in the following table, varied widely from 6%.

TABLE 1

|  |  | Ingot Number | | | |
|---|---|---|---|---|---|
|  |  | 1 | 2 | 3 | 4 |
| Chromium | location 1 | 1.35 | 36.2 | 3.81 | 5.48 |
| weight % | location 2 | 15.1 | 2.85 | — | — |

These wide variations in chromium contents and the non-uniform appearance of fracture surfaces in ingot number one indicated that the elemental chromium was not readily dissolving in the molten metal. Those skilled in the art would realize that this problem could be easily solved by increasing the time the metal is molten. However, an increase in melt time will require additional energy and, if melting in a graphite crucible as planned for larger melts, an increase in melting time would produce an increase in the amount of carbon from the crucible that could be dissolved in the molten metal as a contaminant.

To use these alloys for experimental studies, these four ingots were later remelted using the same cold-wall induction furnace with the metal being held molten for 25 minutes to allow the chromium to dissolve. Sections of the original four ingots were combined to yield three ingots. After fracturing these ingots, no undissolved chromium was observed on the .fracture surfaces. Samples from these ingots were analyzed and found to contain 6.12%, 4.30% and 5.12% chromium by weight. Since 25% excess chromium was originally added these results indicate that chromium content of the final alloy could not be easily controlled when adding all of the chromium as particulate solids.

INGOT NO. 5

Following the discovery of a chromium dissolution problem, a single test alloy was melted using the vanadium-nickel-chromium alloy produced in series X using the cold-wall induction furnace at the U.S. Bureau of Mines facility in Albany, Oreg. The aim bulk chemistry of this alloy differed from that of ingots Nos. 1, 2, 3 and 4.

Each of the raw materials (V-Ni-Cr alloy and other metals in solids forms) necessary for melting of the metal alloy was carefully weighed to within + or −0.01 kilogram.

This alloy, which weighed a total of 4.78 kg, was melted under a partial argon atmosphere as described for alloy No. 1 above. No excess chromium to compensate for vaporization was added to this alloy. Note that not all of the chromium could be added in the form of the vanadium-nickel-chromium alloy. Additional elemental chromium solids (0.86% by weight for alloy No. 5) were added to obtain the desired chemistry in the final alloy. In contrast, 7.46% by weight elemental chromium was used for alloys No. 1, 2, 3 and 4. The total heating time was not well defined because the induction power supply malfunctioned and a nearly fully molten alloy was allowed to solidify within the segmented copper crucible. The next day, after the power supply was repaired, the alloy was remelted and held molten for about 30 minutes before pouring the molten metal into a 105 mm diameter graphite mold. This ingot, which had a nominal chromium content of 5.2% by weight, was sampled, and the sample contained 5.43% chromium by weight. The analyzed value for chromium content was 4.4% higher than the nominal value which indicates that vaporization of chromium was insignificant when the bulk of the chromium was added in the form of a master alloy. Examination of fracture surfaces of this ingot gave no indication that any of the chromium particles did not dissolve.

The analyzed oxygen content of the sample obtained from this ingot was 0.054% by weight. In contrast, the four similar-sized ingots made using the vanadium-nickel alloy obtained commercially had oxygen contents of 0.131% 0.197%, 0.220% and 0.154% by weight. In addition, another ingot of the same chemical composition as Alloy No. 5 was melted in the same manner but using the commercial vanadium-nickel alloy that contained 0.75% oxygen by weight. This other ingot was sampled and found to contain 0.58% oxygen by weight. Clearly, the highly friable vanadium-nickel-chromium alloy produced in Series X is preferred for producing final alloys with lower oxygen contents.

USE OF VANADIUM-NICKEL-CHROMIUM ALLOYS FOR PRODUCTION-SCALE MELTING

EXAMPLE 1: ALLOY A

This alloy was prepared using the vanadium-nickel-chromium alloy produced in Series XI. Each of the raw materials (V-Ni-Cr alloy and other metals in solids forms) necessary for melting of the metal alloy was carefully weighed to within + or −0.05 kilogram. No excess chromium was added, i.e., no allowance was made for volatilization of chromium during melting. Four sets of each components were weighed. Each set weighed 22.847 kg; the total weight to be melted was 91.3 kg.

Each set of weighed metals was placed in a steel drum. A lid was secured onto each drum. Each drum was then rotated several times to mix the alloying metals. The contents of three drums plus about one fourth of the contents of the remaining drum were placed into the melting crucible, filling it approximately to the top. The melting crucible was made of high density, high purity graphite such as that provided by Great Lakes Carbon Corporation, Grade H-490. The remaining three-fourths of the contents of the remaining drum were placed in a loading chamber. The melting crucible, induction coil, tundish and mold were all contained within a single vacuum chamber.

Thereafter, the furnace and loading chamber were sealed and evacuated to a pressure of less than 50 microns. A pre-heat sequence was then started so as to begin to cycle the furnace to the appropriate temperature to completely melt the material in the graphite crucible. Power was applied to the furnace under vacuum until the top of the high density, high purity graphite crucible could be observed through a sight port to have been heated to a dull red color. At this time in the heating cycle (10 minutes from the start), the vacuum was less than 35 microns. Subsequently, the furnace was backfilled with argon to a pressure of about 0.07 atmosphere.

Then, the power applied to the induction melt furnace was increased to 170 kilowatts. After holding for 5 minutes at 170 kilowatts, enough metal in the crucible had melted to allow addition of the metal in the loading chamber. After 13 more minutes using an applied power level of 160 kilowatts, the entire alloy charge was molten. After holding the applied power level at 160 kilowatts for an additional 10 minutes, the temperature of the molten metal was measured to be 1425° C. using an immersion thermocouple. After holding at 160 kilowatts for an additional 2 minutes, the power was decreased to about 100 to 120 kilowatts, and the molten metal was poured into a high density, high purity graphite tundish of the same grade as used for the crucible. The molten metal poured through a 19 mm diameter hole in the bottom of one end of the tundish into a 152 mm diameter mold made of high density, high purity graphite of the same grade as used for the crucible. Slightly more than one hour was allowed for the molten alloy to solidify and cool before opening the vacuum chamber. The ingot and graphite mold were still warm but cool enough (estimated maximum temperature of 100° C.) that oxidation of the metal alloy would not be a problem.

After cooling to room temperature, the ingot was fractured by striking with a hammer. Samples for chemical analyses were obtained from the surface, mid-radius and center of the ingot. The chemical analysis results by weight are as follows:

TABLE II

| Element | Nominal | Surface | Mid-Radius | Center | Average |
|---|---|---|---|---|---|
| Cr (%) | 6.1 | 5.81 | 6.28 | 6.91 | 6.33 |
| O (ppm) | — | 1350 | 1750 | 1540 | 1550 |
| C (ppm) | — | 272 | 260 | 300 | 277 |

The ingot segments of alloy A were further processed to powder using a hydride-dehydride process. Two samples were taken from this powder lot and analyzed for carbon and oxygen content. The analyzed carbon contents of two of the powder samples were 236 and 232 ppm by weight. The average oxygen of the ingot of alloy A was 1550 ppm by weight. The analyzed oxygen contents of two powder samples of alloy A produced by the hydride-dehydride process were 1140 and 1420 ppm by weight.

The analytical chemistry results indicate that vaporization of chromium during melting was not a problem when the bulk of the chromium was added in the form of a vanadium-nickel-chromium alloy. The average analyzed chromium level is within the nominal goal level.

EXAMPLE 2: ALLOY B

This alloy was prepared using the vanadium-nickel-chromium alloy produced in Series XII. Each of the raw materials (V-Ni-Cr alloy and other metals in solids forms) necessary for melting of the metal alloy was carefully weighed to within + or −0.05 kilogram. No excess chromium was added, i.e., no allowance was made for volatilization of chromium during melting. About 29% of the desired Cr was added as elemental solids. Four sets of each component were weighed out. Each set weighed 22.884 kg; the total weight to be melted was 91.536 kg. Each set of weighed metals was placed in a steel drum. A lid was secured onto each drum. Each drum was then rotated several times to mix the alloying metals. The contents of three drums plus about one fourth of the contents of the remaining drum were placed into the melting crucible, filling it approximately to the top. The melting crucible was the same as used for alloy A. The remaining three fourths of the contents of the remaining drum were placed in a loading chamber.

Thereafter, the furnace and loading chamber were sealed and evacuated to a pressure of less than 15 microns. A preheat sequence was then started so as to begin to cycle the furnace to the appropriate temperature to completely melt the material in the graphite crucible. Power at a level of 110 KW was applied to the furnace under vacuum until the top of the high density, high purity graphite crucible could be observed through a sight port to have been heated to a dull red color. At this time in the heating cycle (11 minutes from the start), the vacuum was less than 15 microns. Subsequently, the furnace was backfilled with argon to a pressure of about 0.07 atmospheres.

Then, the power applied to the induction melt furnace was increased to a level ranging from 165 to 170 kilowatts. After holding at this power level for 10 minutes, enough metal in the crucible had melted to allow addition of the metal in the loading chamber. Addition of this metal required a total of 5 minutes time. After an additional 8 minutes (13 minutes total from the time loading from the additions chamber was started), the entire alloy charge was molten. After holding the applied power level between 165 and 170 kilowatts for an additional 17 minutes, the temperature of the molten metal was measured to be 1415° C. using an immersion thermocouple. After holding at 165 kilowatts for an additional 3 minutes, the power was decreased to between 100 and 120 kilowatts and the molten metal was poured into a high density, high purity graphite tundish from which it was poured into a 152 mm diameter mold of the same grade of graphite. Other details are as described for melting of Alloy A.

About two hours were allowed for the molten alloy to solidify and cool before opening the vacuum chamber. The ingot and graphite mold were still warm but could be handled with gloves.

After cooling to room temperature, the ingot was fractured by striking with a hammer. Samples for chemical analyses were obtained from the surface, mid-radius and center of the ingot. The chemical analysis results by weight are as follows:

TABLE III

| Element | Nominal | Surface | Mid-Radius | Center | Average |
|---|---|---|---|---|---|
| Cr (%) | 5.8 | 5.26 | 5.54 | 5.49 | 5.43 |
| O (ppm) | — | 1380 | 1050 | 1150 | 1190 |
| C (ppm) | — | 278 | 276 | 272 | 275 |

Vaporization of chromium during melting was again not a problem. The average analyzed chromium level is within 6.4% of the nominal goal level.

The average carbon level was 275 ppm by weight. The ingot segments of alloy B were further processed to powder using a hydride-dehydride process. Two samples were taken from this powder lot and analyzed for carbon and oxygen content. The analyzed carbon contents of the powder samples were 248 and 248 ppm by weight. The average oxygen content of the ingot of alloy B was 1190 ppm by weight. The analyzed oxygen contents of two powder samples of alloy B produced by the hydride-dehydride process were 1210 and 1240 ppm by weight.

EXAMPLE 3: ALLOY C

Each of the raw materials (V-Ni-Cr alloy and other metals in solids forms) necessary for melting of the metal alloy prepared as described above was carefully weighed to within + or −0.05 kilogram. Three sets of each component were weighed out. Two lots of vanadium-nickel-chromium master alloy were used in the preparation of alloy C. The vanadium-nickel-chromium contents of these two lots were not identical. Because of a shortage of the lot used for the three sets above, a fourth set using a separate lot of vanadium-nickel-chromium was weighed. This set weighed 22.80 kg. The total weight to be melted was 91.74 kg. Again, no excess chromium was added, i.e., no allowance was made for volatilization of chromium during melting. About 28% of the desired Cr was added as elemental solids.

Each set of weighed metals was placed in a steel drum. A lid was secured onto each drum. Each drum was then rotated several times to mix the alloying metals. The contents of all four drums were placed into the melting crucible, filling it approximately to the top. The melting crucible was the same as used for alloys A and B.

Thereafter, the furnace was sealed and evacuated to a pressure of 42 microns. A preheat sequence was then started so as to begin to cycle the furnace to the appropriate temperature to completely melt the material in the graphite crucible. Power at a level of 150 to 160 kilowatts was applied to the furnace under vacuum until the top of the high density, high purity graphite crucible could be observed through a sight port to have been heated to a dull red color. At this time in the heating cycle (9 minutes from the start), the vacuum level was 36 microns. Subsequently, the furnace was backfilled with argon to a pressure of 0.07 atmospheres.

Then, the power applied to the induction melt furnace was increased to approximately 170 kilowatts. After holding at this power level for four minutes, the material was observed starting to melt. After an additional 15 minutes the entire alloy charge was molten. After holding the applied power level at approximately 165 kilowatts for an additional 13 minutes, the power was decreased to between 100 and 120 kilowatts, and the molten metal was poured into a high density, high purity graphite tundish from which it was poured into a 152 mm diameter mold of the same grade of graphite. Other details are as described for melting of alloy A. The temperature of the molten metal could not be measured before pouring because the thermocouple recorder was not functioning.

About two hours were allowed for the molten alloy to solidify and cool before opening the vacuum chamber. The ingot and graphite mold were still warm but could be handled with gloves.

After cooling to room temperature, the ingot was fractured by striking with a hammer. Samples for chemical analyses were obtained from the surface, mid-radius and center of the ingot. The chemical analysis results by weight are as follows:

TABLE IV

| Element | Nominal | Surface | Mid-Radius | Center | Average |
|---|---|---|---|---|---|
| Cr (%) | 5.5 | 5.23 | 5.11 | 5.19 | 5.18 |
| O (ppm) | — | 1050 | 1210 | 810 | 1020 |
| C (ppm) | — | 238 | 210 | 224 | 224 |

The average carbon level was 224 ppm by weight. The ingot segments of alloy C were further processed to powder using a hydride-dehydride process. Two samples were taken from this powder lot and analyzed for carbon and oxygen content. The analyzed carbon contents of the powder samples were 242 and 232 ppm by weight. The average oxygen content of the ingot of alloy C was 1020 ppm by weight. The analyzed oxygen contents of two powder sample of alloy C produced by the hydride-dehydride process were 940 and 1030 ppm by weight.

EXAMPLE 4: ALLOY D

This alloy was prepared using a vanadium-nickel-chromium alloy as above described. Each of the raw materials (V-Ni-Cr alloy and other metals in solids forms) necessary for melting of the metal alloy was carefully weighed to within + or −0.05 kilogram. About 38% of the desired Cr was added as elemental solids. Four sets of each component were weighed out. Each set weighed 22.91 kg. The total weight to be melted was 91.64 kg.

Each set of weighed metals was placed in a steel drum. A lid was secured onto each drum. Each drum was then rotated several times to mix the alloying metals. The contents of all four drums were placed into the melting crucible, filling it approximately to the top. The melting crucible was the same as used for alloys A, B and C.

Thereafter, the furnace was sealed and evacuated to a pressure of 41 microns. A preheat sequence was then started so as to begin to cycle the furnace to the appropriate temperature to completely melt the material in the graphite crucible. Power at a level slightly in excess of 140 kilowatts was applied to the furnace under vacuum until the top of the high density, high purity graphite crucible could be observed through a sight port to have been heated to a dull red color. At this time in the heating cycle (8 minutes from the start), the vacuum level was 34 microns. Subsequently, the furnace was backfilled with argon to a pressure of 0.07 atmospheres.

Then, the power applied to the induction melt furnace was increased to approximately 165 kilowatts. After holding at this power level for 5 minutes, the material was observed starting to melt. After an additional 11 minutes, the entire alloy charge was molten. After holding the applied power level at approximately 160 to 165 kilowatts for an additional 9 minutes, the temperature of the molten metal was measured to be 1450° C. using an immersion thermocouple. After holding at 160 to 165 kilowatts for an additional three minutes, the power was decreased to between 100 and 120 kilowatts, and the molten metal was poured into a high density, high purity graphite tundish from which it was poured into a 152 mm diameter mold of the same grade of graphite. Other details are as described for melting of alloy A.

Over four hours were allowed for the molten alloy to solidify and cool before opening the vacuum chamber. The ingot and mold had cooled to room temperature.

The ingot was fractured by striking with a hammer. Samples for chemical analyses were obtained from the surface, mid-radius and center of the ingot. The chemical analysis results by weight are as follows:

TABLE V

| Element | Nominal | Surface | Mid-Radius | Center | Average |
|---|---|---|---|---|---|
| Cr (%) | 5.1 | 5.20 | 5.14 | 5.41 | 5.25 |

TABLE V-continued

| Element | Nominal | Surface | Mid-Radius | Center | Average |
|---|---|---|---|---|---|
| O (ppm) | — | 860 | 940 | 1080 | 960 |
| C (ppm) | — | 206 | 174 | 200 | 193 |

The average carbon level was 193 ppm by weight. The ingot segments of alloy D were further processed to powder using a hydride-dehydride process. Two samples were taken from this powder lot and analyzed for carbon and oxygen content. The analyzed carbon contents of the powder samples were 173 to 169 ppm by weight. The average oxygen content of ingot of alloy B was 960 ppm by weight. The analyzed oxygen contents of two powder samples of alloy B produced by the hydride-dehydride process were 1430 or 730 ppm by weight.

The invention has been described in detail with particular reference to certain preferred embodiments thereof, but it will be understood that variations and modifications can be effected within the spirit and the scope of the invention.

We claim:

1. A master alloy comprising vanadium, nickel, and chromium substantially free of unalloyed chromium inclusions consisting essentially of a vanadium, nickel alloy, alloyed with chromium wherein approximately equal weight percentages of vanadium and nickel are alloyed together and then alloyed with from between 4% by weight to about 17% by weight of chromium, such percentages being of the total resultant alloy weight and wherein the resultant alloy contains from more than about 40% by weight to about 48% by weight of vanadium and from more than about 40% by weight to about 48% by weight of nickel.

* * * * *